UNITED STATES PATENT OFFICE.

NATHAN SULZBERGER, OF NEW YORK, N. Y.

CATALYST AND PROCESS FOR PRODUCING THE SAME.

1,338,709.  Specification of Letters Patent.  Patented May 4, 1920.

No Drawing.  Application filed May 28, 1915. Serial No. 30,915.

*To all whom it may concern:*

Be it known that I, NATHAN SULZBERGER, a citizen of the United States, resident of New York city, in the county and State of New York, have invented new and useful Improvements in Catalysts and Processes for Producing the Same, of which the following is a specification.

It is a well-established fact, that catalysts are most efficient, when most finely divided in the material, which is to be catalytically treated. To accomplish this result various methods have been proposed, as for instance increasing the surface of the catalytic agent by distributing the same upon a carrier, such as infusorial earth, asbestos, kaolin, and the like.

All methods however employed before my invention consisted in so far as I am aware in making use of two (or more) separate substances, the one being the catalyst, the other the carrier. These separate substances were either simply mixed together in their dry state or other physical or mechanical means were used for finely distributing the one over the other. Thus, for instance, in cases, where the substance which was to be used as a catalyst offered compounds soluble in water, such solutions were used to impregnate therewith the solid carrier.

I have found that a much more efficient method to finely distribute a catalyst upon a carrier, consists in making use of a chemical compound containing the metal, which is to act as a catalyst, and the substance, which, in whole or in part, is to be used as a carrier for the same in one and the same molecule. Since in such chemical compound, atoms of the catalyst are chemically combined with atoms, or group of atoms, of the carrier-material, a disintegration of such compound, for instance by a process of reduction, will produce, so to speak, an "atomistic" mixture of the catalyst and the carrier. The metal-compounds, being prepared preferably from solutions of the re-acting products, are also of high uniformity.

The thus obtained most intimate mixture of finest particles of the substances offers the catalyst, not only with correspondingly increased surface, in consequence of the very fine distribution of the catalyst upon and within the carrying material, but also in a most uniform homogeneous condition, for the reason that both the catalyst, as well as the material, now acting as a carrier, were originally members of one and the same molecule of a chemical compound. The fact of the great uniformity of the catalytic material obtained by my method is of highest technical importance, as only, when using a uniform material, under given working conditions is one assured of uniform results.

The particular chemical compounds utilized, according to the present invention, are borates or like compounds containing boron.

The method for disintegrating such compounds in most cases will consist in a process of reduction, for instance by means of hydrogen or suitable gases possessing reducing action, at ordinary, or especially, higher temperature. Generally speaking, it is best to carry on the process of reduction at the lowest possible temperature, at which the metal of the compound will be transformed into an efficient catalytic active state. Any process of reduction may be employed, which will not destroy the catalytic property of the reduced material. Since anti-catalytic material depends upon the particular catalytic process, in which it is used, differing from process to process (the substances acting anti-catalytically in one process, not necessarily acting in this way in another process), the absence of any specific anti-catalytic substances cannot be stated.

In order to state specific examples of chemical combinations of metals, which are of use in carrying out my process, I mention the following:

Compounds of metals possessing catalytic action, as for instance nickel, palladium, platinum, etc. with boron, titanium, chromium, etc., in particular borates, titanates, chromates, uranates, etc.

In the following example I wish to illustrate, without however limiting myself to the stated quantity and working-conditions, the method for preparing a catalyst after my process, consisting in finely distributed metallic nickel in a carrier containing boron; nickel-chlorid is precipitated by borax-solution. Such nickel-borate, representing a greenish powder, insoluble in water, is reduced by passing a current of hydrogen-gas over the same at a temperature, just sufficiently high to completely reduce the nickel of such compound to its metallic catalytic active state. The very dark, or black, product obtained possesses magnetic property and valuable catalytic action. A portion of the same, about 0.2%, was used in hydrogenating cotton-seed oil, the same being stirred into the oil immediately after the process of reduction and under constant exclusion from the air. This can very simply be accomplished by reducing the nickel-borate in a vessel, which may also be used in the process for hydrogenating the cotton-seed oil. After reduction of the nickel-borate the oil is poured over the reduced product, which has cooled off, while still passing over such product the hydrogen-gas. During the process, perhaps due also to colloidal condition of its boric content, the nickel remains well in suspension in the oil. After filtration the oil solidifies to a practically colorless mass. An addition of a small amount of, for instance, a palladium-salt, preferably added to the solution of the nickel-salt before the same is precipitated, for instance, by means of a solution of borax, still further enhances the catalytic action of the product.

All those modifications, which may suggest themselves to those skilled in the art and science, shall be considered as coming under the scope of this invention. Thus also mixtures of metals may be employed, as for instance, as already shown, of nickel-borate with amounts of a platinum metal, as palladium, etc. The chemical compounds, suitable for producing the catalytic material, may also be mixed with each other and with such substances as will not destroy the catalytic action of the product in the particular catalytic process, in which it is used. An excess also of the carrying material, as well as of the catalytic metal (metals) may be present. Additions may be made at any time to the metal-compounds, therefore before, as well as after the metal (metals) of the same has been transformed into its catalytic active state. The decomposition of the products may in some cases suitably be accomplished by and during the catalytic process itself, in which they are used at ordinary or modified pressure.

The following claims include not only such unitary products as specifically referred to above but also mixtures of such products with each other or with similar products or with other substances which do not destroy the catalytic action of the product, in the particular catalytic process in which it is used.

The word "hydrogen" in the following claims includes all suitable materials, in which hydrogen is the active reducing agent; the word "metal" includes metals.

I claim:

1. The method of preparing a catalyst, which comprises reducing a chemical compound of a metal possessing catalytic action with the borate radical, the amount of the borate radical being sufficient to serve as an effective carrier of the catalytic metal after reduction; substantially as described.

2. The method of preparing a catalyst, which comprises reducing nickel borate to convert the nickel into a catalytically active state, the amount of the borate radical being sufficient to serve as an effective carrier of the catalytic metal after reduction; substantially as described.

3. The method of preparing a catalyst, which comprises co-precipitating nickel and palladium together with the borate radical, and reducing the precipitate to convert the nickel and palladium into a catalytically active state; substantially as described.

4. A catalyst comprising nickel and palladium finely and uniformly distributed upon a carrier containing boron; substantially as described.

5. A catalyst comprising a reduction product of a borate of a metal possessing catalytic action, the amount of the borate radical being sufficient to serve as an effective carrier of the catalytic metal after reduction; substantially as described.

6. A catalyst comprising a reduction product of nickel borate, the amount of the borate radical being sufficient to serve as an effective carrier of the catalytic metal after reduction; substantially as described.

7. A catalyst comprising a reduction product of nickel borate, and containing co-precipitated and reduced palladium; substantially as described.

NATHAN SULZBERGER.

Witnesses:
 HENRY HASPER,
 WOLDEMAR HAUPT.